United States Patent
Sato et al.

[11] Patent Number: 5,892,986
[45] Date of Patent: Apr. 6, 1999

[54] IMAGE ERASING DEVICE

[75] Inventors: Koichi Sato; Yasuhiro Yamamoto, both of Tokyo, Japan

[73] Assignee: Asahi Kogaku Kogyo Kabushiki Kaisha, Tokyo, Japan

[21] Appl. No.: 795,203

[22] Filed: Feb. 5, 1997

[30] Foreign Application Priority Data

Feb. 14, 1996 [JP] Japan .................................... 8-050918

[51] Int. Cl.⁶ ...................................................... G03B 17/50
[52] U.S. Cl. .............................................................. 396/30
[58] Field of Search ............................. 396/30, 429, 430; 349/34, 8, 199, 22, 24

[56] References Cited

U.S. PATENT DOCUMENTS

| | | | |
|---|---|---|---|
| 4,126,456 | 11/1978 | Pole et al. ........................................ | 96/1 |
| 4,956,713 | 9/1990 | Takanashi et al. ........................ | 358/209 |
| 5,161,233 | 11/1992 | Matsuo et al. ............................ | 355/218 |
| 5,424,156 | 6/1995 | Aoki et al. . | |
| 5,516,607 | 5/1996 | Iijima et al. ................................ | 430/20 |

FOREIGN PATENT DOCUMENTS 52280  1/1993  Japan .

*Primary Examiner*—Safet Metjahic
*Assistant Examiner*—John Chizmar
*Attorney, Agent, or Firm*—Greenblum & Bernstein, P.L.C.

[57] ABSTRACT

An image erasing device mounted on an electro-developing type camera with an electro-developing recording medium, to erase an electronically developed an image. When the image recorded on the electro-developing recording medium is read therefrom, the electro-developing recording medium is illuminated by a light source which emits a laser beam. During this reading operation, the line sensor is moved with the light source along the electro-developing recording medium, so that the image is read. When the image recorded on the electro-developing recording medium is erased, the intensity of light outputted by the light source is controlled to have a value greater than in the reading operation, and the light source is moved along the electro-developing recording medium.

10 Claims, 14 Drawing Sheets

IMAGE ERASING DEVICE

BACKGROUND OF THE INVENTION

1. Field of the Invention

The present invention relates to a camera using a recording medium in which an object image obtained through a photographing optical system is electronically developed, and more particularly, to a device for erasing the image recorded on the recording medium.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. In this specification, such a recording medium is referred to as an electro-developing recording medium, and an electronic still camera using the electro-developing recording medium is referred to as an electro-developing type camera.

An image recorded on the electro-developing recording medium can be erased by heating the recording medium at a predetermined temperature. However, if a separate erasing device is mounted on the electro-developing type camera to erase the image, the structure in the electro-developing type camera becomes bulky and complex.

SUMMARY OF THE INVENTION

Therefore, an object of the present invention is to provide an image erasing device which can erase an image recorded on an electro-developing recording medium, without making the structure in the camera bulky and complex.

According to the present invention, there is provided an image erasing device comprising a light source illuminating an electro-developing recording medium so that an image is read therefrom. A controller controls the intensity of light outputted by the light source so that the intensity of the light has a value greater than the light for reading the image from the electro-developing recording medium, to erase the image recorded on the electro-developing recording medium.

Further, according to the present invention, there is provided an image erasing device comprising a light source illuminating an electro-developing recording medium, and a controller controlling the intensity of light outputted by the light source. The image recorded on the electro-developing recording medium being read therefrom when the intensity of the light has a first value, and the image being erased by heat generated from the light source when the intensity of the light has a second value larger than the first value.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
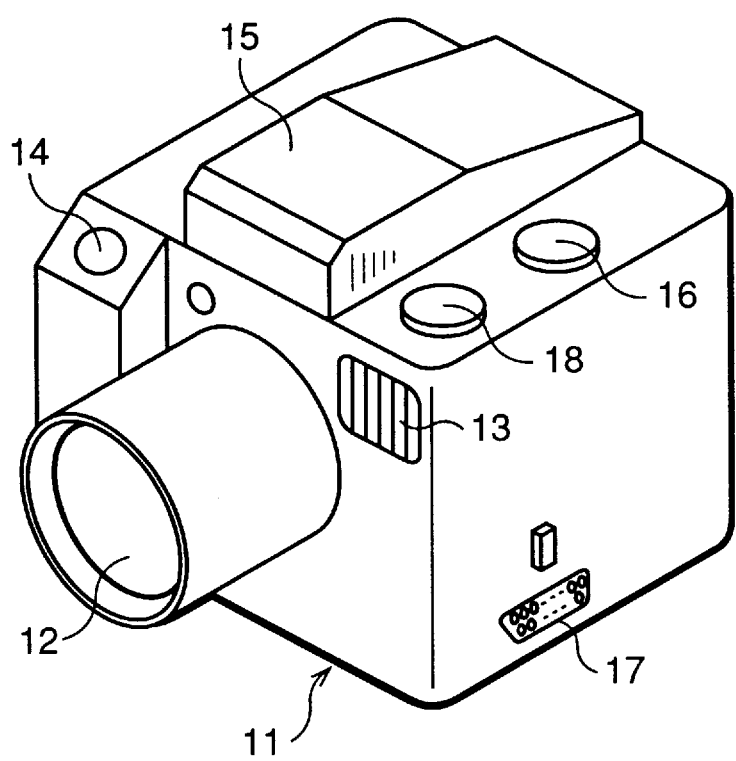
FIG. 1 is an external view showing an electro-developing type camera to which an embodiment of the present invention is applied.

FIG. 1 is an external view of an electro-developing type camera to which an embodiment according to the present invention is applied.

When viewing a camera body 11 from the a front side, a photographing optical system 12 including includes a photographing lens system and so on that is provided approximately at a center portion of a front surface of the camera body 11. An electronic flash 13 is disposed thereon to the right of and above the photographing optical system 12. A release switch 14 is provided on the side opposite to the electronic flash 13.

On the upper surface of the camera body 11, a view finder 15 is provided at the center portion thereof and extends from the front to the rear end of the camera body 11. A scan start switch 16 and an erase switch 18 are provided on an upper surface and beside the view finder 15. An output terminal 17 is provided on a lower portion of a side surface of the camera body 11, so that an image signal obtained by this camera can be outputted to an external recording device (not shown).

Figure 2:
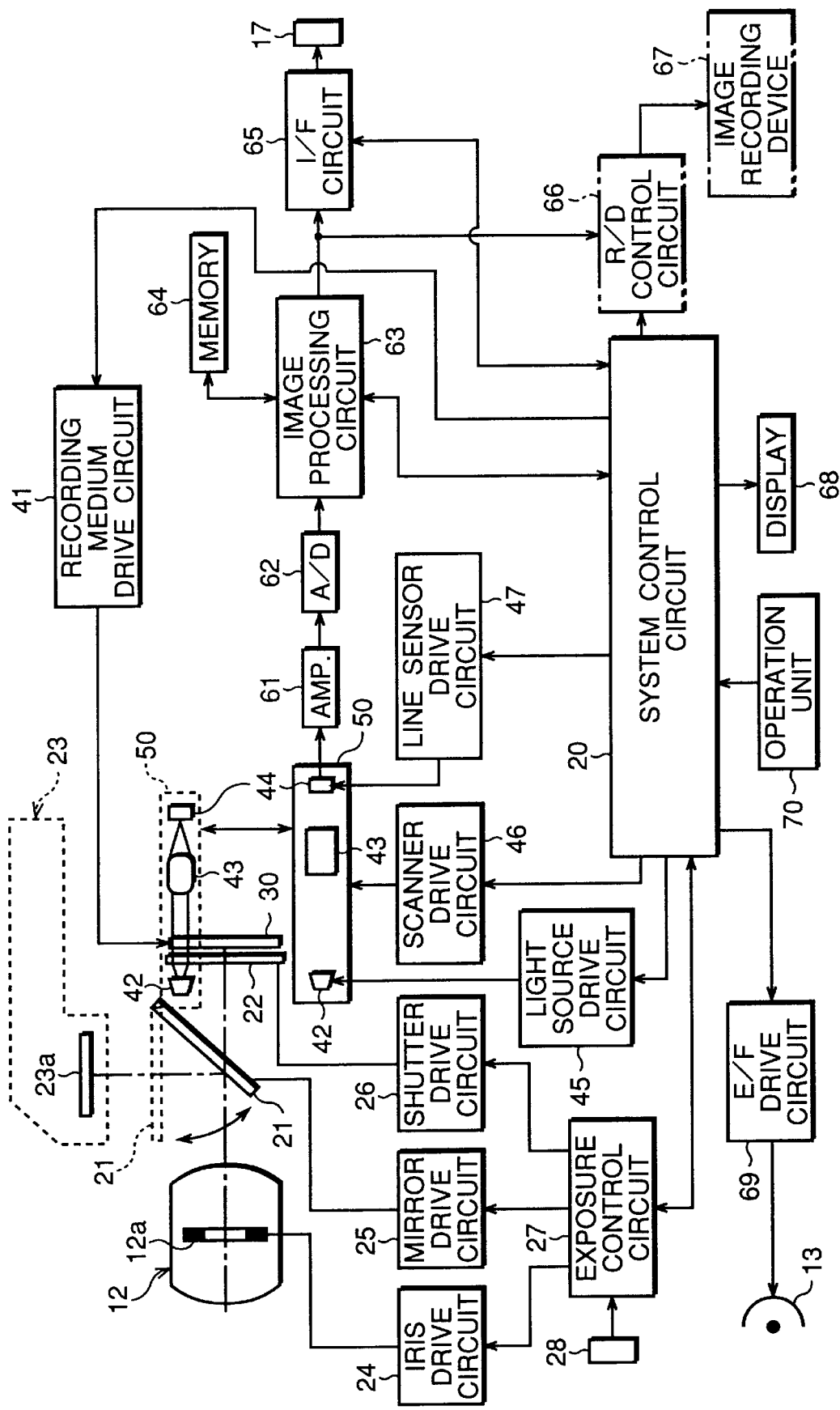
FIG. 2 is a block diagram of the electro-developing type camera shown in FIG. 1.

FIG. 2 is a block diagram of the electro-developing type camera, in which a system control circuit 20 including includes a microcomputer that is mounted to control the electro-developing type camera as a whole.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42, a scanner optical system 43, and a line sensor 44 are supported by the scanning mechanism 50, and are moved along the electro-developing recording medium 30 by a scanning operation of the scanning mechanism 50.

The line sensor 44 may be a one-dimensional CCD sensor of, for example, 2000 pixels. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The light source 42 can output a laser beam having a predetermined intensity. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. When a scanning is carried out by the scanning mechanism SO, the scanner optical system 43 is positioned between the electro-developing recording medium 30 and the line sensor 44, so that the image developed by the electro-developing recording medium 30 is illuminated by the light source 42 and formed on the light receiving surface of the line sensor 44, through an operation of the scanner optical system 43. Namely, the scanner optical system 43 is disposed on the optical path of the light beam which passes through the electro-developing recording medium 30, and the line sensor 44 is moved in an imaging plane, on which an image is formed by the scanner optical system 43.

ON and OFF control and the laser beam intensity control of the light source 42 is performed by a light source drive circuit 45. Control of the reading operation of pixel signals generated in the line sensor 44 is carried out by a line sensor drive circuit 47. Control of the movement of the scanning mechanism 50 is performed by a scanner drive circuit 46. The circuits 45, 46, and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth pixel signals.

The pixel signals read from the memory 64 are inputted to an interface circuit 65 through the image processing circuit 63, so that the pixel signals are subjected to a predetermined process, such as a format conversion, and can then be outputted to an external computer (not shown) through the output terminal 17. The pixel signals outputted from the image process circuit 63 are subjected to a predetermined process, such as an image compression and a format conversion in a recording device control circuit 66, so that the pixel signals can be recorded on a recording medium, such as an IC memory card, for example, in an image recording device 67. The interface circuit 65 and the recording device control circuit 66 are operated in accordance with a command signal outputted from the system control circuit 20.

An operation unit 70, including the release switch 14, the scan start switch 16, and the erase switch 18, are connected to the system control circuit 20. A photography operation (i.e., a recording operation) and a reading operation are performed by operating the release switch 14 and the scan start switch 16, respectively. An erase operation is performed by operating the erase switch 18. A display device 68 is connected to the system control circuit 20 to indicate various setting conditions of the electro-developing type camera. Further, an electric flash drive circuit 69 is connected to the system control circuit 20 to control the flash operation of the electronic flash 13.

Figure 3:
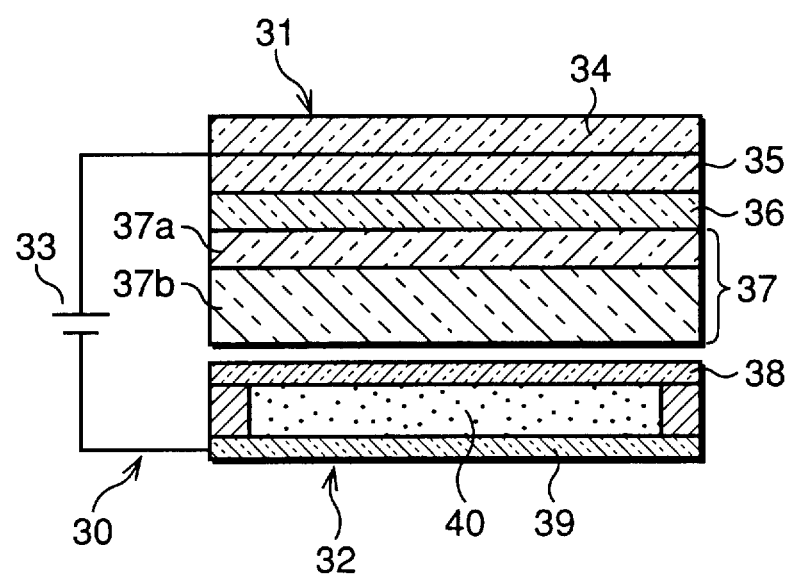
FIG. 3 is a view showing a structure of an electro-developing recording medium.

FIG. 3 shows a structure of the electro-developing recording medium 30, which is basically the same as that shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is displayed on the liquid crystal display 40 as a visible image, and thus, an object image is developed. Namely, the visible image is generated in accordance with the electric charge.

The electric charge storage medium 32 is a liquid crystal display (i.e., LCD) having a memory-type liquid crystal. The developed visible image is held therein even if the electric field is removed. The developed visible image of the LCD can be erased by heating it, using a laser beam at a predetermined temperature. As a result, the same electric charge storage medium 32 can be used repeatedly.

Figure 4:
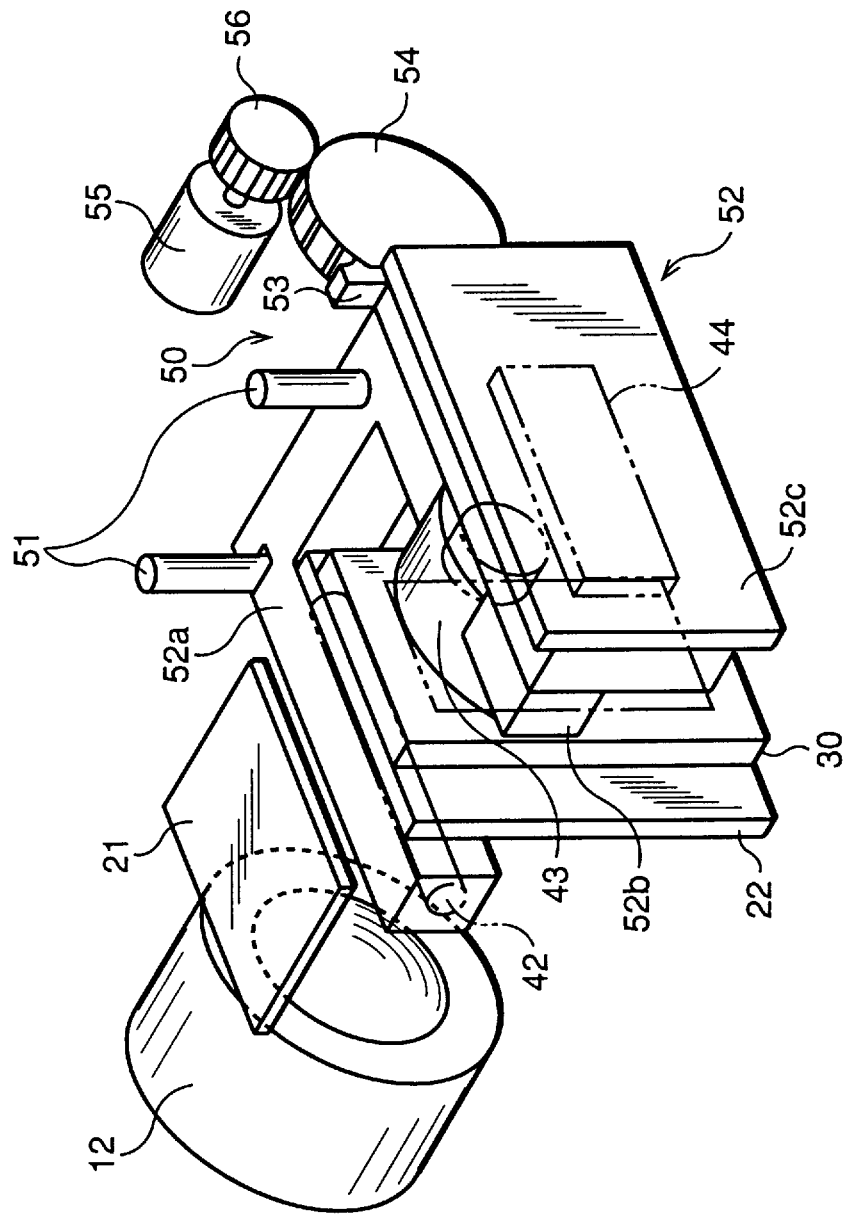
FIG. 4 is a perspective view showing a scanning mechanism.

FIG. 4 shows the structure of the scanning mechanism 50, and members provided around the mechanism 50.

The scanning mechanism 50 has a moving member 52 which is slidably supported by a pair of guide shafts 51 and has first and second leg portions 52a and 52b and a support portion 52c. The first leg portion 52a is extended between the quick return mirror 21 and the shutter 22, and the second leg portion 52b is extended behind the electro-developing recording medium 30. The support portion 52c is provided behind the second leg portion 52b. The light source 42, the scanner optical system 43, and the line sensor 44 are attached to the first leg portion 52a, the second leg portion 52b, and the support portion 52c, respectively. The light source 42 and the line sensor 44 are both extended in a horizontal direction. A rack 53 fixed to the moving member 52 is meshed with a pinion 54, which is meshed with a gear 56 provided on an output shaft of a scan drive motor 55.

When a reading of an image from the electro-developing recording medium 30 is not performed, the moving member 52 is in a position offset from a path between the photographing optical system 12 and the electro-developing recording medium 30; this position being below the electro-developing recording medium 30, for example. As described later, when an image recorded on the electro-developing recording medium 30 is read, the scan drive motor 55 is rotated, and thus the moving member 52 is moved upward so that a scan of the line sensor 44 is carried out, and the line sensor 44 is moved in a direction perpendicular to the longitudinal direction of the line sensor 44. Similarly, when the image recorded on the electro-developing recording medium 30 is erased, the moving member 52 is moved upward by the operation of the scan drive motor 55, and thus, the light source 42 is moved in a direction perpendicular to the width of the electro-developing recording medium 30.

Figure 5:
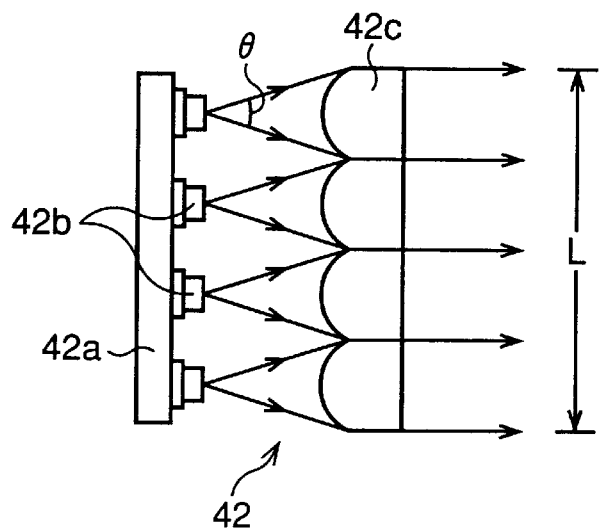
FIG. 5 is a plane view showing a light source.

FIG. 5 is a plane view showing the light source 42. A plurality of laser diodes 42b are aligned on a support frame 42a. Although there are four laser diodes 42b in FIG. 5, it can be more than four. A collimating lens 42c is provided in front of the laser diodes 42b. Although the spread angle θ of the laser beam outputted by the laser diodes 42b is 30° through 40°, for example, the laser beam is converted to a parallel beam by the collimating lens 42c, and is radiated onto the light receiving surface of the electro-developing recording medium 30. The laser beam outputted by the light source 42 has a linear shape, a length (L) of which is more than or equal to a width of the electro-developing recording medium 30, the width corresponding to the longitudinal direction of the first leg portion 52a (see FIG. 4).

Figure 6:
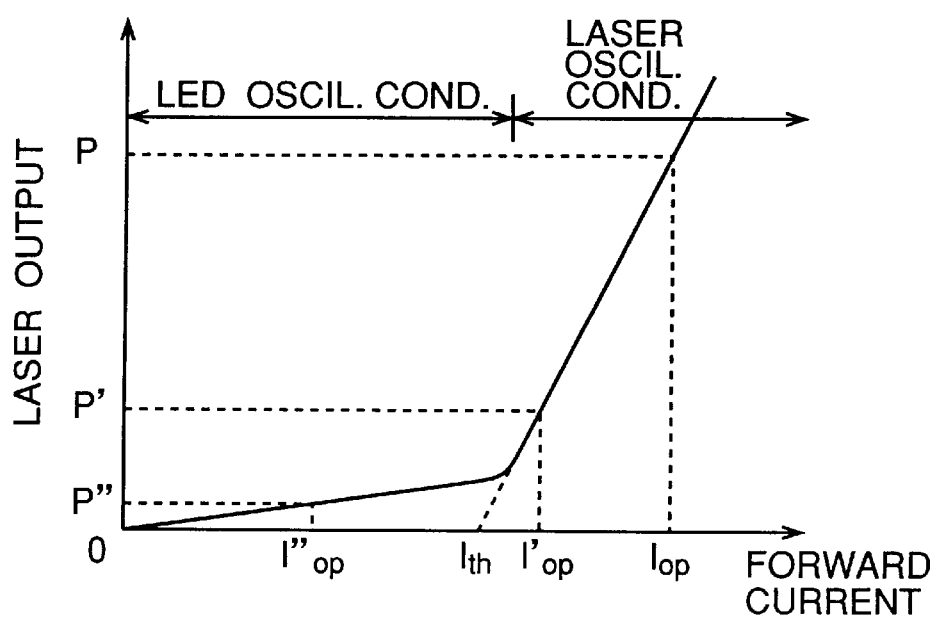
FIG. 6 is a view showing the relationship between a forward current flowing in laser diodes and the intensity of light outputted by the laser diodes.

FIG. 6 shows the relationship between a forward current flowing in the laser diodes 42b and the intensity of light outputted by the laser diodes 42b. When the value of the forward current is $I''_{op}$, i.e. less than a first threshold value $(I_{th})$, the intensity of light (P'') is relatively low, hence the laser diodes 42b operate in an LED oscillating condition to output an illuminating light. When the value of the forward current is $I'_{op}$ slightly higher than the first threshold value $(I_{th})$, the laser diodes 42b operate in a laser oscillating condition. However, the intensity of light (P') being low, the laser diodes 42b output an illuminating light. When the value of the forward current significantly exceeds the first threshold value $(I_{th})$, the intensity of light drastically increases, and when the value of the forward current exceeds a second threshold value (not shown) to become $I_{op}$, for example, the intensity of light is high enough to erase an image recorded on the electro-developing recording medium 30, thus the laser diodes 42b output an erasing light.

Figure 7:
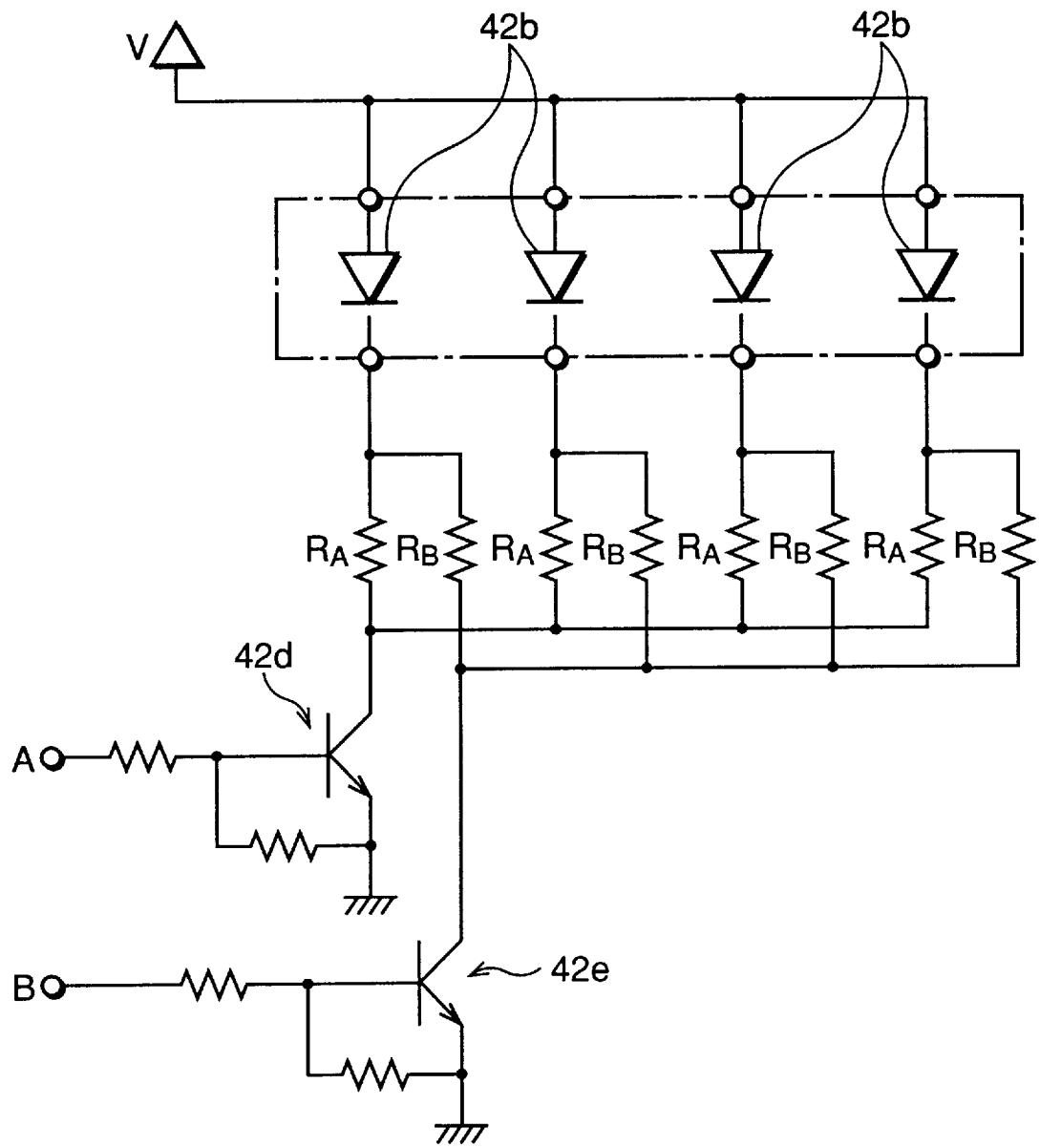
FIG. 7 is a block diagram showing a circuit of a light source drive circuit.

FIG. 7 shows an example of the light source drive circuit 45. The forward voltage terminal of each of the laser diodes 42b is connected to a power supply V, and the backward voltage terminal of each of the laser diodes 42b is connected to first and second resistances RA and RB. The first resistances RA are connected to a collector of a first transistor 42d, and the second resistances RB are connected to a collector of a second transistor 42e. The emitters of the first and second transistor 42d and 42e are grounded, and voltages corresponding to control signals (A) and (B) outputted by the system control circuit 20 are applied to the bases of the first and second transistors 42d and 42e.

The value of the first resistance RA is larger than that of the second resistance RB. The value of the first resistance RA is $$RA = (V - VF)/I'_{op} \qquad (1)$$

for example, or $$RA = (V - VF)/I''_{op} \qquad (2)$$

and the value of the second resistance RB is $$RB = (V - VF)/I_{op} \qquad (3)$$

wherein VF is a forward voltage drop of the laser diode 42b.

When an image recorded on the electro-developing recording medium 30 is read therefrom, the control signal (A) is set to a high level (HI), and the control signal (B) is set to a low level (LO). Consequently, the first transistor 42d is turned ON, and the second transistor 42e is turned OFF, so that the voltage applied to the laser diode 42b becomes relatively low due to the first resistors RA. In other words, the intensity of light outputted by the laser diode 42b is relatively small, and this light is an illuminating light. When the first resistors RA has a value indicated by the formula (1), the laser diode 42b operates in the laser oscillating condition, and thus, the illuminating light is a laser beam. Conversely, when the first resistors RA has a value indicated by the formula (2), the laser diode 42b operates in the LED oscillating condition to output the illuminating light.

On the other hand, when the image recorded on the electro-developing recording medium 30 is erased, the control signal (A) is set to "LO", and the control signal (B) is set to "HI". As a result, the first transistor 42d is turned OFF, and the second transistor 42e is turned ON, so that the voltage applied to the laser diode 42b becomes relatively high due to the second resistors RB. Hence, the intensity of light of the laser beam (i.e., an erasing light) outputted by the laser diode 42b is relatively large.

Figure 8:
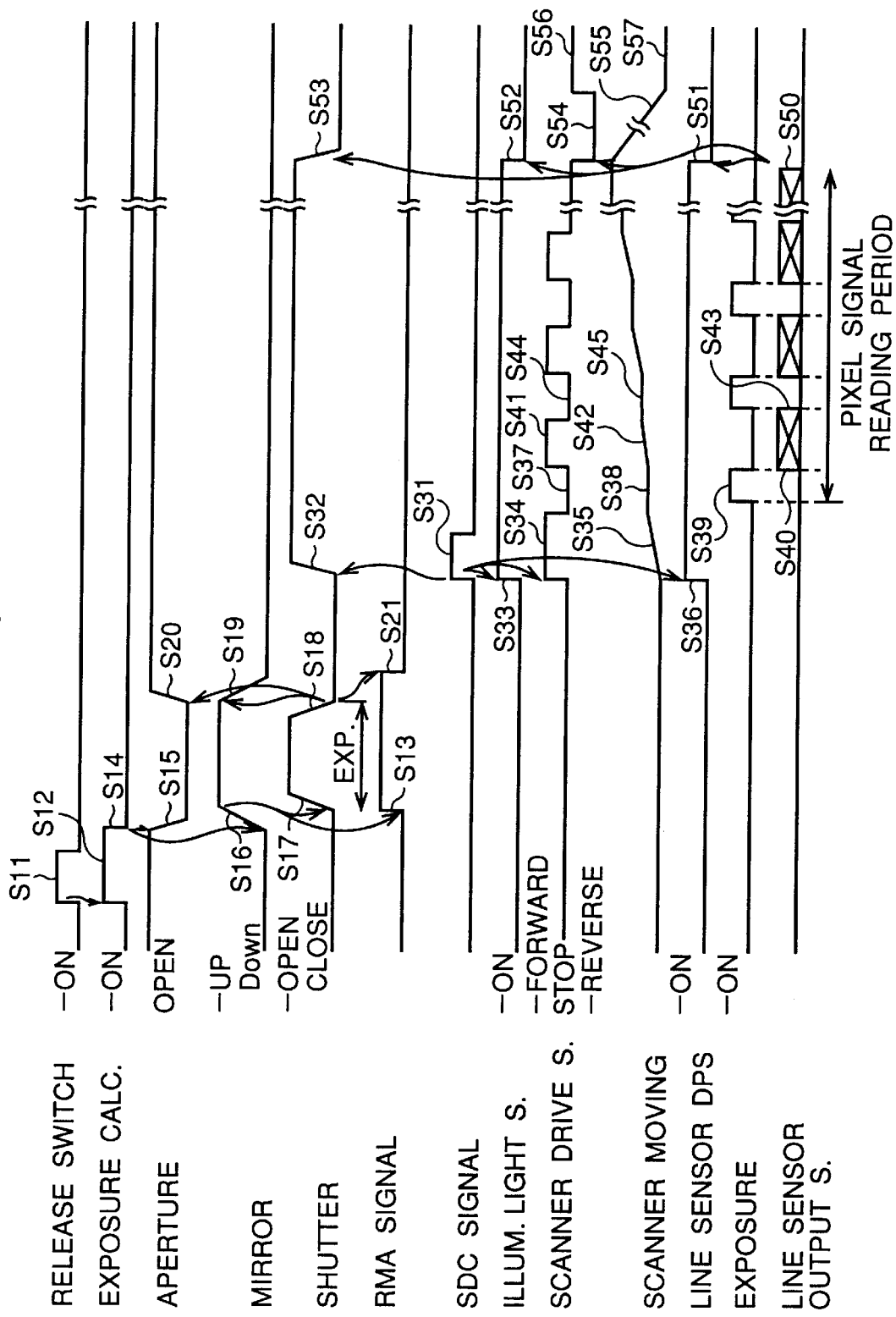
FIG. 8 is a timing chart showing a recording operation and a reading operation.
Figure 9:
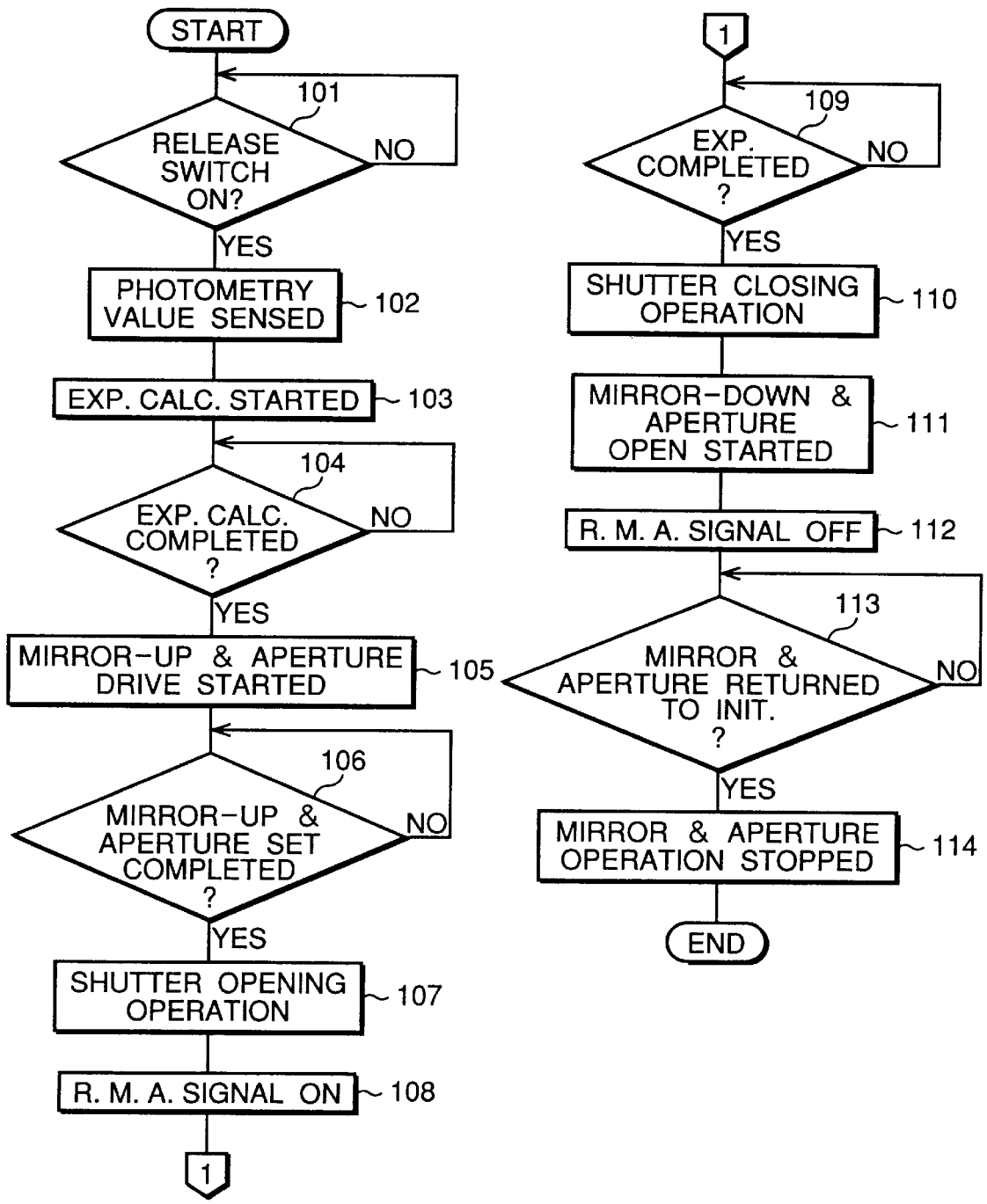
FIG. 9 is a flow chart of a program for performing the recording operation.
Figure 10A:
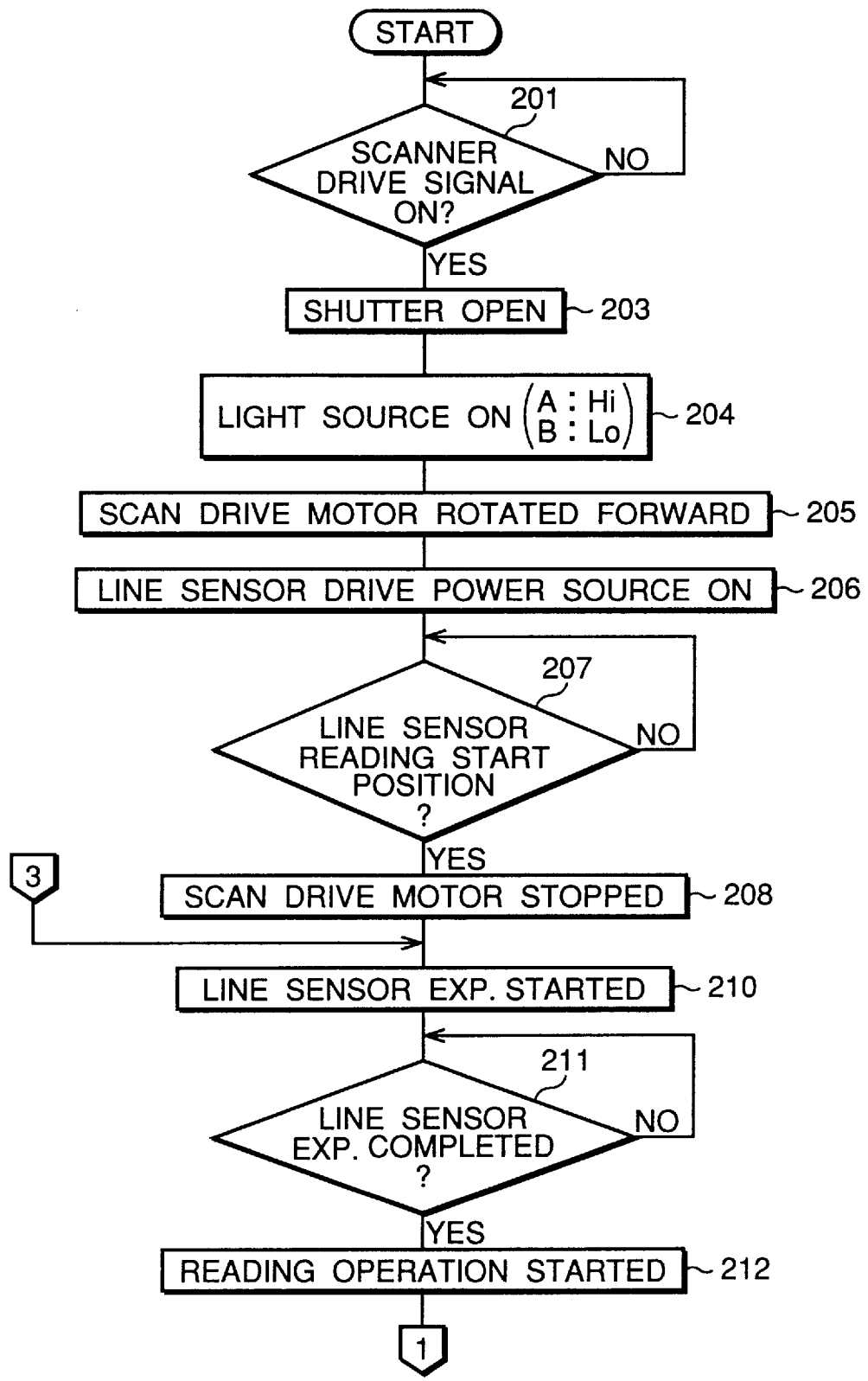
FIGS. 10A, 10B, and 10C are flow charts of a program for performing the reading operation.
Figure 10B:
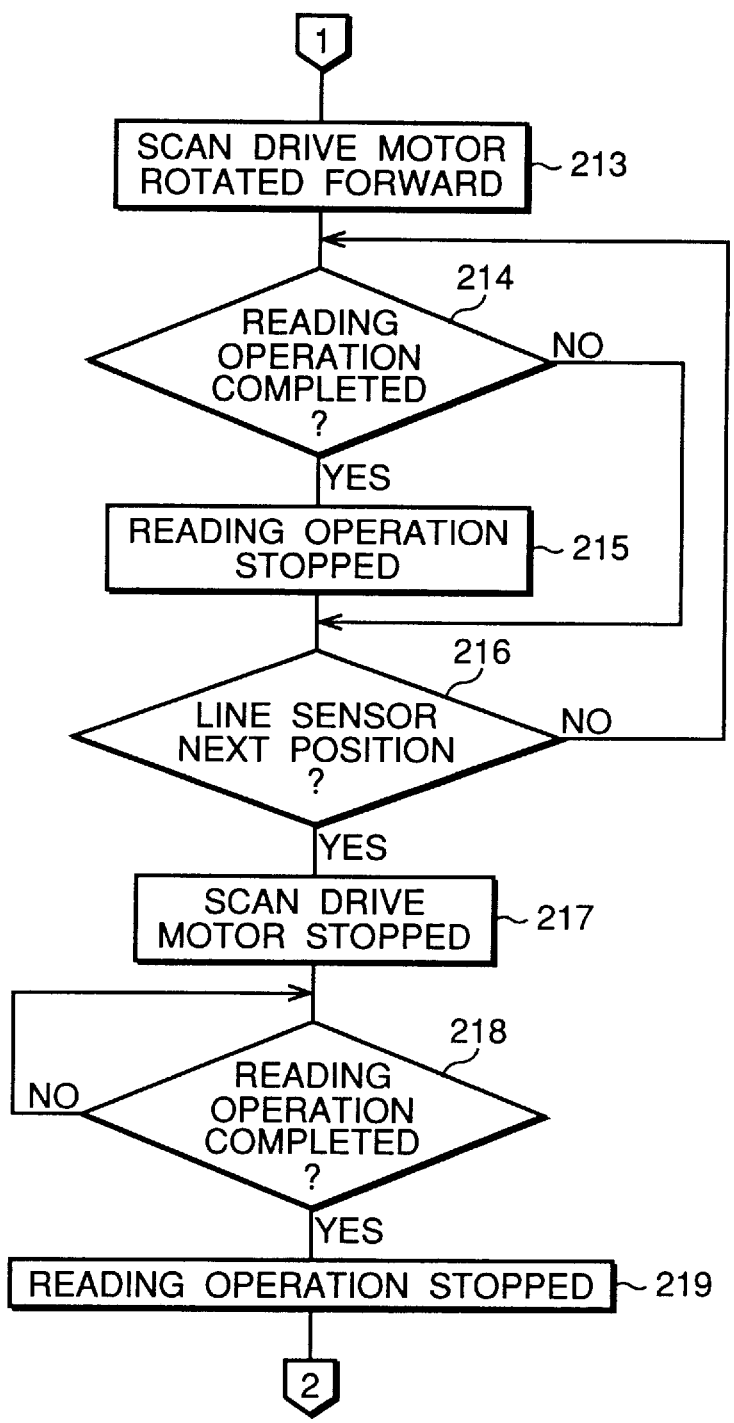
Figure 10C:
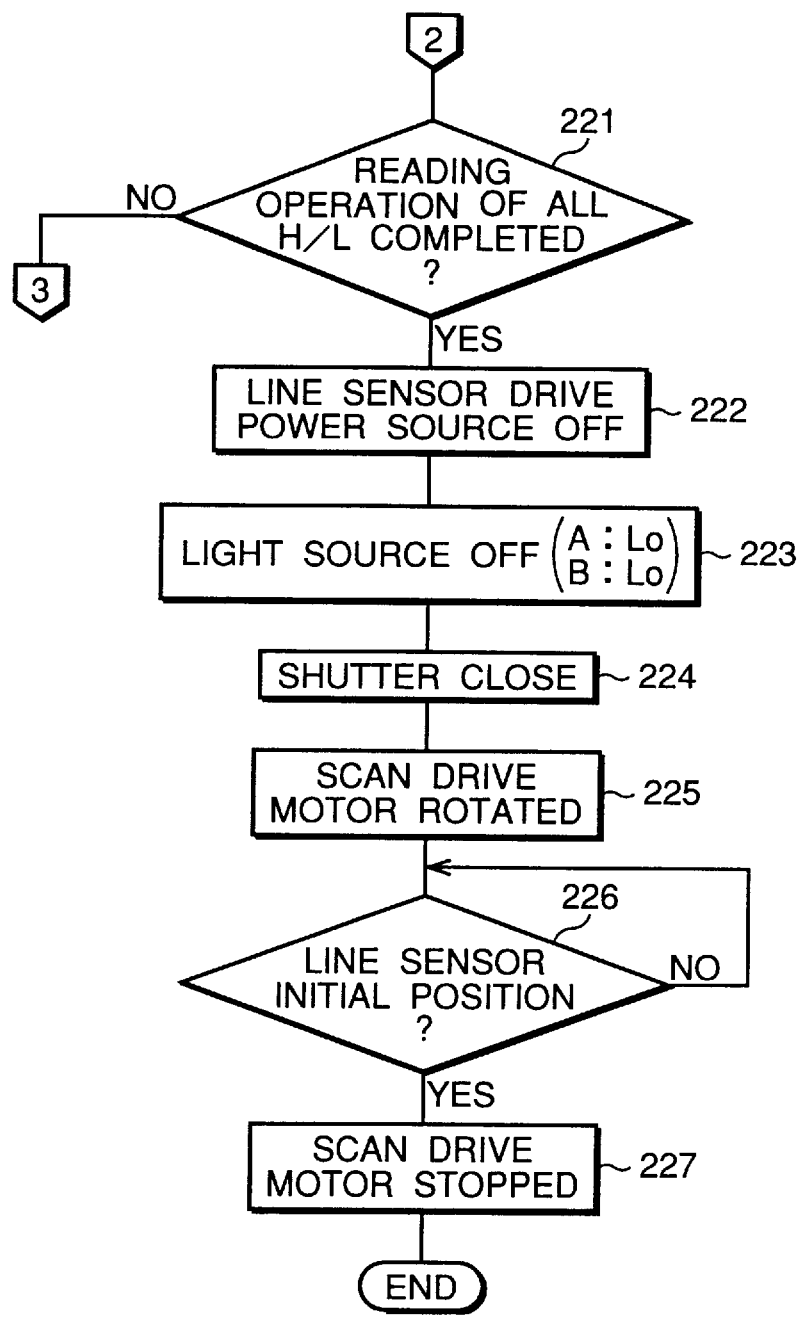

FIG. 8 is a timing chart showing a recording operation (i.e., a photographing operation) in which an image is recorded on the electro-developing recording medium 30, and a reading operation in which the image is read therefrom. FIGS. 9, 10A, 10B, and 10C are flow charts of a program for performing the recording operation. With reference to these drawings, the recording operation and the reading operation will be described.

When it is sensed in Step 101 that the release switch 14 has been depressed (reference S11), an output signal from the photometry sensor 28, i.e., a photometry value, is sensed in Step 102. Then, in Step 103, an exposure calculation is initiated based on the photometry value (reference S12). When the completion of the exposure calculation is confirmed in Step 104 (reference S14), a recording operation is performed in Step 105 and the remaining Steps in accordance with the calculation result.

In Step 105, the degree of opening of the aperture 12a is adjusted from the fully open state to a predetermined degree of opening (reference S15), and the quick return mirror 21 is changed from the down position to the up position (reference S16). Upon confirmation in Step 106 that the quick return mirror 21 has been changed to the up position and the adjustment of degree of opening the aperture 12a has been completed, the shutter 22 is opened in Step 107 (reference S17). Then, a recording medium activating signal is outputted in Step 108 (reference S13), so that an electric voltage is applied to the electro-developing recording medium 30.

When the exposure time obtained based on the exposure calculation has elapsed and it is confirmed in Step 109 that the exposure has been completed, the shutter 22 is closed in Step 110 (reference S18). With the completion of the closing operation of the shutter 22, Step 111 is executed so that a rotation of the mirror 21 to the down position is started (reference S19) and a return to a fully open state of the aperture 12a is started (reference S20). In Step 112, the output of the recording medium activating signal is stopped (reference S21).

Thus, the recording medium activating signal is continuously outputted at least while the shutter 22 is open, and during this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

When it is confirmed in Step 113 that the mirror 21 and the aperture 12a have returned to the initial conditions thereof, respectively, the operations of the mirror 21 and the aperture 12a are stopped in Step 114, and thus, this normal recording operation ends.

Then, when the scan start switch 16 is pressed, a scanning operation of the scanning mechanism 50 is started, so that the program of the reading operation is executed.

By pressing the scan start switch 16, a scanner drive signal is outputted. When it is confirmed in Step 201 that the scanner drive signal has been outputted (reference S31), the shutter 22 is opened (reference S32) in Step 203. In Step 204, the light source 42 is lit, and the "HI" control signal (A) and the "LO" control signal (B) are outputted by the system control circuit 20. Namely, the light source 42 operates as an illuminating light source, so that the electro-developing recording medium 30 is illuminated (reference S33).

In Step 205, a scanner drive signal is outputted (reference S34), so that the scan drive motor 55 rotates in a forward direction, and thus the moving member 52 of the scanning mechanism 50 starts to move upward from the lowest position of the electro-developing recording medium 30 (reference S35), i.e., from the initial position of the scanning mechanism 50. In Step 206, a line sensor drive power source included in the line sensor drive circuit 47 is turned ON (reference S36).

When it is confirmed in Step 207 that the line sensor 44 has been set at a reading start position (i.e., the first horizontal scanning line of the image to be scanned), the output of the scanner drive signal is stopped in Step 208 (reference S37), and thus the scan drive motor 55 is stopped (reference S38). This stopping operation is controlled by counting pulse signals, for example, used for rotating the scan drive motor 55.

Then, in Step 210, an exposure of the line sensor 44 is started, so that an accumulation of an electric charge by the line sensor 44 is performed (reference S39). When it is confirmed in Step 211, by sensing that a constant time has passed, for example, that the exposure of the line sensor 44 has been completed, in Step 212, a reading scan of the line sensor 44 is started, and pixel signals of one horizontal scanning line are outputted from the line sensor 44 (reference S40). In Step 213, the scanner drive signal for operating the scan drive motor 55 in a forward direction is outputted (reference S41), so that the moving member 52 moves upward (reference S42).

During this movement of the moving member 52, when it is confirmed in Step 214 that the reading scan of the line sensor 44 has been completed, the reading scan is stopped in Step 215 (reference S43). Note that the completion of the reading operation is controlled by counting pulse signals, for example, which are outputted from the line sensor drive circuit 47 to drive the line sensor 44. When the completion of the reading scan is not confirmed in Step 214, Step 215 is skipped and Step 216 is executed, so that it is determined whether or not the line sensor 44 has been set at the position of the next horizontal scanning line, i.e., the next reading position. When the line sensor 44 has not been set at the position of the next horizontal scanning line, Steps 214 through 216 are executed again.

When it is confirmed in Step 216 that the line sensor 44 has been set at the position of the next horizontal scanning line, the output of the scanner drive signal is stopped in Step 217 (reference S44), and thus the scan drive motor 55 is stopped (reference S45). Then, in Step 218, the completion of the reading operation of the line sensor 44 is confirmed, in the same way as for Step 214, and the reading scan is stopped in Step 219. Namely, even when the loop of Steps 214 through 216 ends without executing Step 215, the reading scan of the line sensor 44 is completed in Step 219.

In Step 221, it is determined whether a reading scan for all of the horizontal scanning lines has been completed. The number of all of the horizontal scanning lines may be 2000, for example, and in Step 221, it is determined whether the counter value, which counts every reading operation of one horizontal scanning line, has reached 2000. When the reading operation of all of the horizontal scanning lines has not been completed, the process returns to Step 210, and the operations described above in Steps 210 through 221 are repeated.

Thus, when all of the horizontal scanning lines have been read (reference S50), the process goes from Step 221 to Step 222. In Step 222, the drive power source of the line sensor 44 is turned OFF (reference S51), and in Step 223, the light source 42 is turned OFF (reference S52). Namely, the control signals (A) and (B) are both set to "LO". In Step 224, the shutter 22 is closed (reference S53), and in Step 225, a scanner drive signal for operating the scan drive motor 55 in the rearward direction is outputted (reference S54), and thus the moving member 52 starts to descend (reference S55).

During the descending movement of the moving member 52, when it is confirmed in Step 226 that the line sensor 44 has returned to the initial position of the scanning mechanism 50, the output of the scanner drive signal is stopped in Step 227 (reference S56), so that the scan drive motor 55 is stopped (reference S57). Note that the sensing operation of the initial position executed in Step 226 is performed based on a signal outputted when part of the moving member 52 transverses a photo-interrupter (not shown).

Figure 11:
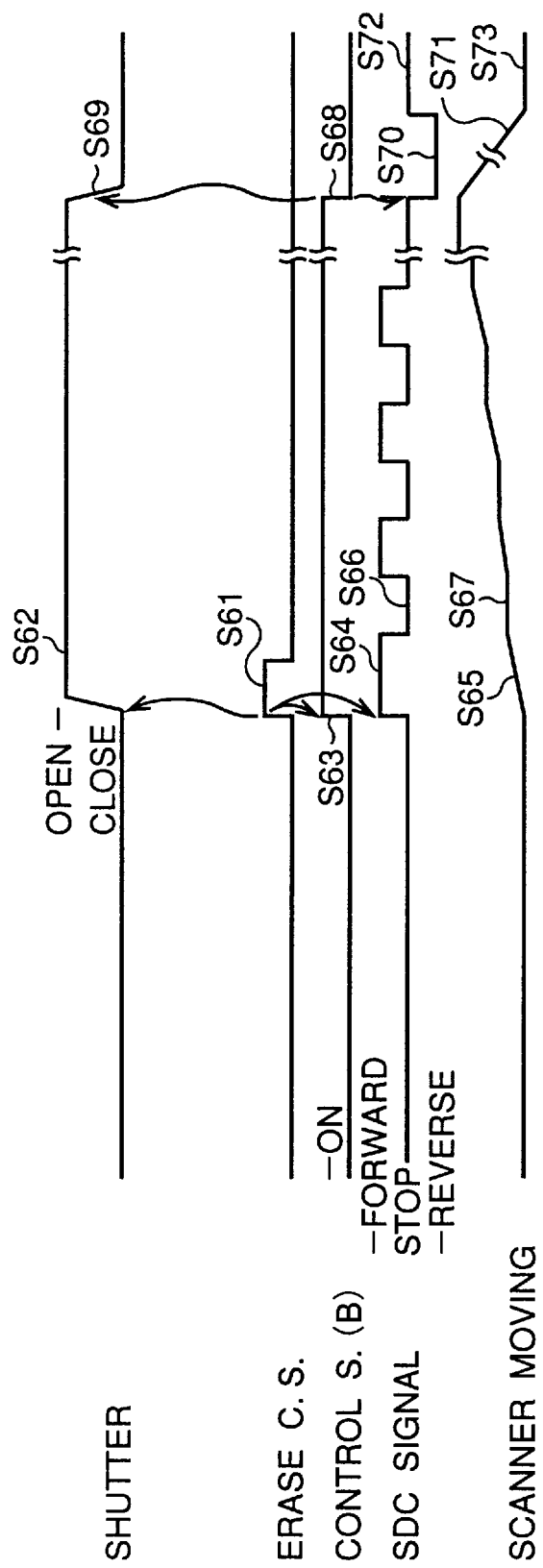
FIG. 11 is a timing chart showing an erasing operation.
Figure 12A:
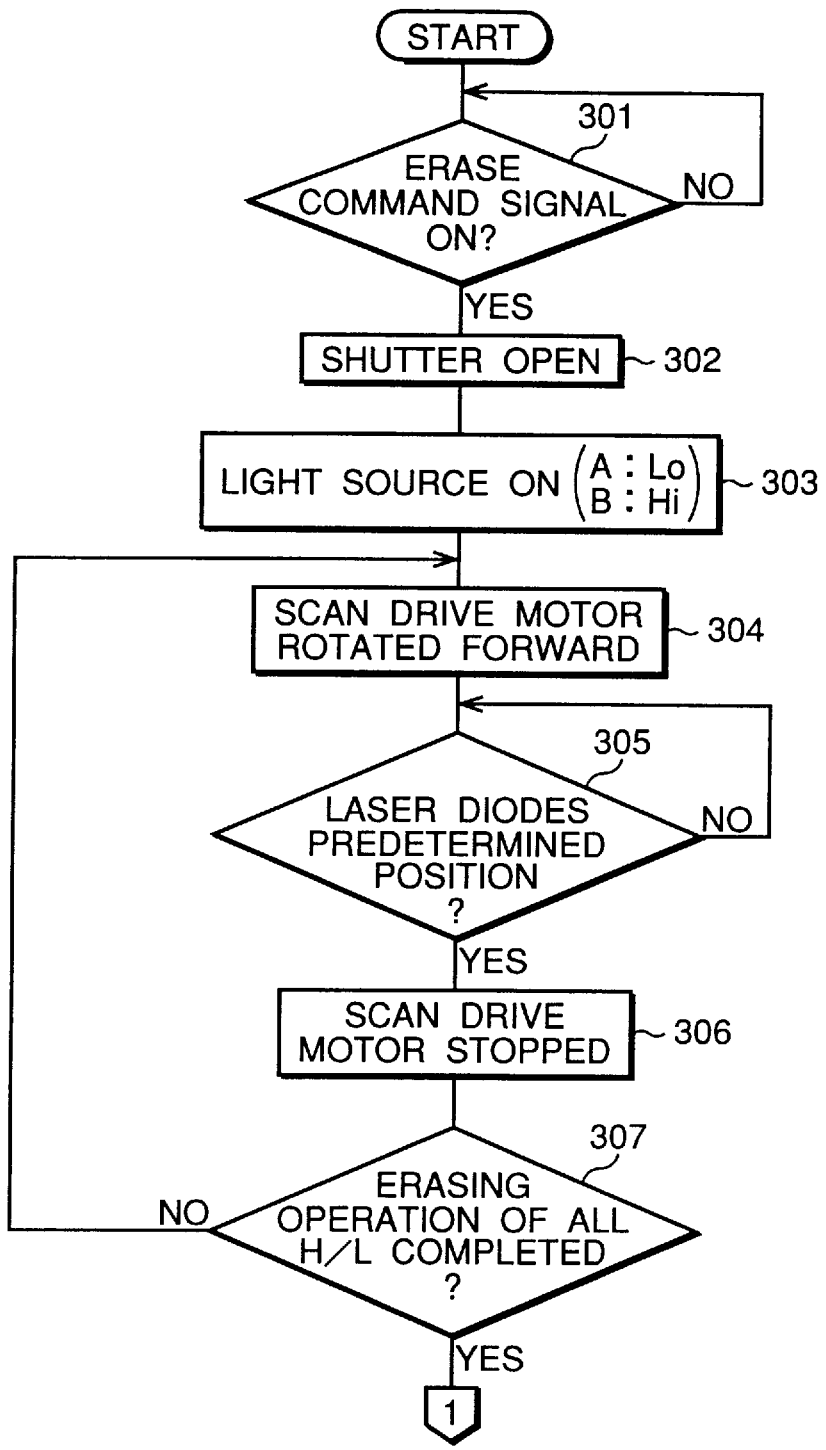
FIGS. 12A and 12B are flow charts of a program for performing the erasing operation.
Figure 12B:
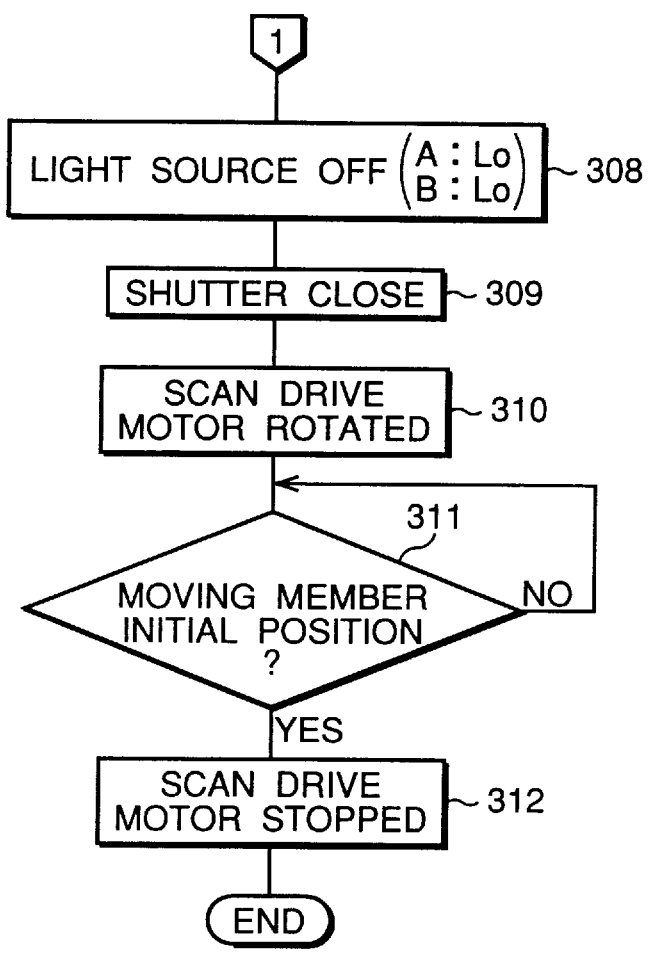

FIG. 11 is a timing chart showing an erasing operation in which a recorded image on the electro-developing recording medium 30 is erased. FIGS. 12A and 12B are flow charts of a program performing the erasing operation. With reference to these drawings, the erasing operation will be described below.

By pressing the erase switch 18, an erase command signal is outputted. When the erase command signal output is confirmed in Step 301 (reference S61), the shutter 22 is opened (reference S62) in Step 302. In Step 303, the light source 42 is lit, and the "LO" control signal (A) and the "HI" control signal (B) are outputted by the system control circuit 20. Namely, the light source 42 operates as an erasing device emitting the erasing light having an intensity of light, which is greater than that in the reading operation, onto the electro-developing recording medium 30 (reference S63).

In Step 304, a scanner drive signal is outputted (reference S64), and the scan drive motor 55 is rotated in a forward direction, thus moving upward the moving member 52 of the scanning mechanism 50 from the lowest position of the electro-developing recording medium 30 (reference S65), i.e., from the initial position of the scanning mechanism 50. When it is confirmed in Step 305 that the laser diodes 42b have been set at a position corresponding to a predetermined horizontal scanning line, the output of the scanner drive signal is stopped in Step 306 (reference S66), and thus the scan drive motor 55 is stopped (reference S67). As a result, the electro-developing recording medium 30 is heated by the erasing light outputted by the laser diodes 42b, and thus, the image corresponding to the horizontal scanning line is erased.

Then, in Step 307, it is determined whether the erasing operation for all of the horizontal scanning lines has been completed. Namely, in Step 307, in the same way as for Step 221 of FIG. 10C, it is determined whether the number of the counter, counted every time an erasing operation for one horizontal scanning line has been completed, has reached 2000, for example. When the erasing operation of all of the horizontal scanning lines has not been completed, the process returns to Step 304, and the operations from Steps 304 through 307 described above are repeated.

Thus, when all of the horizontal scanning lines have been erased, the process goes from Step 307 to Step 308, in which the light source 42 is turned OFF. Namely, the control signals (A) and (B) are both set to "LO" (reference S68). In Step 309, the shutter 22 is closed (reference S69), and in Step 310, a scanner drive signal for operating the scan drive motor 55 in the rearward direction is outputted (reference S70), and thus the moving member 52 starts to descend (reference S71).

During the descending movement of the moving member 52, when it is confirmed in Step 311 that the moving member 52 has returned to the initial position of the scanning mechanism 50, the output of the scanner drive signal is stopped in Step 312 (reference S72), so that the scan drive motor 55 is stopped (reference S73).

As described above, in the embodiment, an image recorded on the electro-developing recording medium 30 is heated at a predetermined temperature to be erased. This is performed by controlling the intensity of the light outputted by the light source 42 which is used to read the image recorded on the electro-developing recording medium 30. Therefore, a separate erasing device is not needed in the electro-developing type camera, whereby simplifying and reducing the structure in the electro-developing type camera.

Note that, when the image recorded on the electro-developing recording medium 30 is to be erased, the laber diode 42b may be operated in either the laser oscillating condition or the LED oscillating condition. Namely, the value of the first resistor RA can be determined according to the formula (1), in accordance with the intention of the application.

Further, note that the light source 42 is not restricted to a laser light source, and can be a device other than the laser light source.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI. 8-50918 (filed on Feb. 14, 1996) which is expressly incorporated herein, by reference, in its entirety.

We claim:

1. A device for erasing an image recorded on an electro-developing recording medium by which an image formed thereon is electronically developed, said device comprising:

a light source that illuminates said electro-developing recording medium so that said image is read therefrom; and a controller that controls an intensity of light outputted by said light source so that said intensity of said light has a value greater than said light for reading said image from said electro-developing recording medium, in order to erase said image recorded on said electro-developing recording medium.

2. A device according to claim 1, wherein said light source outputs a laser beam.

3. A device according to claim 1, wherein said light source outputs a parallel light beam.

4. A device according to claim 1, wherein said light source outputs a linear light beam longer than a width of said electro-developing recording medium.

5. A device according to claim 1, further comprising a light source that moves mechanism moving said light source in a direction perpendicular to a width of said electro-developing recording medium.

6. A device according to claim 1, wherein said light source operates in one of an LED oscillating condition and a laser oscillating condition, said light source outputting an illuminating light when operating in said LED oscillating condition and outputting an erasing light when operating in said laser oscillating condition.

7. A device according to claim 1, wherein said light source operates in one of an LED oscillating condition and a laser oscillating condition, said light source outputting one of an illuminating light and an erasing light in accordance with said intensity of said light outputted in said laser oscillating condition.

8. A device according to claim 1, wherein said electro-developing recording medium comprises an electrostatic information recording medium that generates an electric charge in accordance with an image formed thereon, and an electric charge storage medium which generates a visible image in accordance with said electric charge and which can hold said visible image.

9. A device according to claim 8, wherein said electric charge storage medium comprises a liquid crystal display having a memory-type liquid crystal.

10. A device for erasing an image recorded on an electro-developing recording medium by which an image formed thereon is electronically developed, said device comprising:

a light source that illuminates said electro-developing recording medium; and a controller that controls an intensity of light outputted by said light source, an image recorded on said electro-developing recording medium being read therefrom when said intensity of said light has a first value, said image being erased by a heat generated from said light source when said intensity of said light has a second value larger than said first value.

* * * * *